Patented Feb. 19, 1952

2,586,343

UNITED STATES PATENT OFFICE 2,586,343

PREPARATION OF CYCLIC SUBSTITUTED SYNTHETIC ESTROGENS

Emil Kaiser, Alford L. Andersen, Jr., and Jerry J. Svarz, Chicago, Ill., assignors to Armour and Company, Chicago, Ill., a corporation of Illinois No Drawing. Application November 13, 1947, Serial No. 785,802

10 Claims. (Cl. 260—619)

This invention relates to the preparation of cyclic substituted synthetic estrogens. The compounds produced are estrogenic and are useful intermediates for further reactions in the production of estrogenic and bactericidal compounds.

The introduction of the cyclohexene-2 group in ortho position to the phenolic hydroxyl groups of diethylstilbestrol, hexestrol and dienestrol has presented a very difficult problem. Only one method of preparation of an ortho cyclohexene-2 substituted phenol, that of the cyclohexene-2-phenol, is reported in the literature. ("The Pyrolysis of Phenyl Cyclohexenyl Ether" by J. W. Cornforth, G. K. Hughes, F. Lions; Journal of the Royal Society of New South Wales 71, 323 (1930).) The yield was not better than 5% of the calculated yield in this procedure, which consisted of the heating to 215° of phenyl cyclohexenyl ether and isolating the small amount of o-cyclohexene-2-phenol formed in the reaction.

An object of the present invention is to provide a process for the rearranging of cyclohexene-2 ethers of diethylstilbestrol, hexestrol and dienestrol, with from ten to twenty times higher yields than the phenyl cyclohexenyl ether to the corresponding phenols. A further object is to provide new compounds useful as intermediates in the preparation of estrogenic and bactericidal compounds. Other specific objects and advantages will appear as the specification proceeds.

We have found that the cyclohexene-2 ethers of diethylstilbestrol, hexestrol and dienestrol unexpectedly can be rearranged in ten to twenty times higher yields than the phenyl cyclohexenyl ether to the corresponding phenols by heating them in an N-disubstituted aniline. We prefer to use an atmosphere of nitrogen in the rearrangement procedure. Improved yields up to 60–70% were obtained when acid anhydride was added to the reaction mixture. In this case, the esters of the phenols were isolated.

The new compounds produced by the process and useful as intermediates in the preparation of estrogenic and bactericidal compounds include cyclohexene-2 ether of diethylstilbestrol, cyclohexene-2 of hexestrol, cyclohexene-2 ether of dienestrol, 3,3'-cyclohexene-2-diethylstilbestrol, 3,3'-cyclohexene-2-diethylstilbestrol ester, 3,3'-cyclohexene-2-hexestrol, 3,3'-cyclohexene-2-hexestrol ester, 3,3'-cyclohexene-2-dienestrol, 3,3'-cyclohexene-2-dienestrol ester.

The dicyclohexene-2 ether of diethylstilbestrol was prepared by two different methods: method I, the reaction between 1-bromocyclohexene-2, diethylstilbestrol and potassium carbonate in methyl ethyl ketone; method II, the reaction between 1,2-dibromocyclohexene and diethylstilbestrol in the presence of sodium alcoholate. Method I yielded 12% of the theoretical amount of dicyclohexene-2 ether of stilbestrol. Method II, an adaptation of the procedure of Solonina (W. Solonina, J. Chem. Soc., 76 I, 681 (1899)), yielded 25–35% of the same compounds. Method II was therefore used to prepare the dicyclohexene ether of hexestrol.

The dicyclohexene-2 ethers were rearranged to the 3,3'-disubstituted derivatives by refluxing in diethylaniline in an atmosphere of nitrogen. 3,3'-dicyclohexene-2 diethylstilbestrol was isolated in a 25% yield and 3,3'-dicyclohexene-2 hexestrol in a 38% yield.

A better yield of rearrangement products averaging 65 to 67% was obtained by the use of benzoic anhydride in the reaction mixture. The dibenzoates of the 3,3'-disubstituted products were formed in this reaction. Saponification of the dibenzoates yielded 3,3'-dicyclohexene-2 diethylstilbestrol and 3,3'-dicyclohexene-2 hexestrol respectively. These compounds were identical to those formed by the rearrangements of the dicyclohexene-2 ethers without the use of benzoic anhydride.

The following specific examples may be set out:

*Preparation of the dicyclohexene-2 ether of diethylstilbestrol.—Method I.*—Diethylstilbestrol and 1-bromocyclohexene-2 were reacted in the same manner as described for allyl phenyl ether (Claison, Ann., 418, 69 (1919)).

The dicyclohexene-2 ether of diethylstilbestrol was crystallized from methanol. M. P. 118–119°. Yield, 12.1%.

*Method II.*—Twenty grams of 1,2 dibromocyclohexene was added to a solution prepared by dissolving 4 g. of sodium and 10.72 g. of diethylstilbestrol in 100 ml. of absolute ethanol and the mixture refluxed for 24 hours. The solution was then concentrated under reduced pressure and treated with a solution of 10 g. of sodium hydroxide in 100 ml. of water. The alkaline solution was extracted with ethyl ether and the ether layer washed with 100 ml. of 10% aqueous sodium hydroxide and water. The ether was removed by distillation and the residue crystallized twice from 100 ml. portions of 95% ethanol. M. P. 117–119°. Yield, 4.43 g. (25.3%).

Analysis calculated for $C_{30}H_{36}O_2$: C, 84.11; H, 8.41. Found: C, 84.08; H, 8.57.

*Preparation of 3,3'-dicyclohexene-2 diethylstilbestrol.*—Two grams of the dicyclohexene-2 ether of diethylstilbestrol were dissolved in 15 ml. of diethylaniline and the solution refluxed for 7 hours in an atmosphere of nitrogen. The diethylaniline was removed and the product crystallized from an ethyl ether-petroleum ether mixture as described for 3,3'-diallyl diethylstilbestrol. The substance was recrystallized by dissolving in 10 ml. of ethanol and adding 10% of water to the hot solution. Yield 0.5 g. (25%). M. P. 154–156°.

Analysis calculated for $C_{30}H_{36}O_2$: C, 84.11; H, 8.41. Found: C, 83.62; H, 8.86.

*Preparation of the 3,3'-dicyclohexene-2 diethylstilbestrol dibenzoate.*—One and a half grams of the dicyclohexene-2 ether of diethylstilbestrol and 3 g. of benzoic anhydride were dissolved in 15 ml. of diethylaniline and refluxed for 6 hours in an atmosphere of nitrogen. After cooling, 100 ml. of 2 N hydrochloric acid were added and the mixture extracted with ether. The ether layer was washed with 2 N acid, water and dried over sodium sulphate. It was then concentrated to about 15 ml. and 30 ml. of methanol added. The dibenzoate crystallized in the cold. It was recrystallized by dissolving in 15 ml. of carbontetrachloride and adding 30 ml. of methanol. Yield 1.5 g. M. P. 188–199°.

Analysis calculated for $C_{44}H_{44}O_4$: C, 83.09; H, 6.92. Found: C, 82.96; H, 7.15.

*Saponification of 3,3'-dicyclohexene-2 diethylstilbestrol dibenzoate.*—One-half gram of 3,3'-dicyclohexene-2 diethylstilbestrol dibenzoate was refluxed for 2 hours in an atmosphere of nitrogen with 10 ml. of a 10% potassium hydroxide isopropanol solution. After cooling, the mixture was diluted with 30 ml. of water and acidified with N-hydrochloric acid. An oil precipitated which solidified on standing at room temperature. This was filtered, washed with water, and dissolved in 10 ml. of ethanol. The solution was clarified with a small amount of charcoal. After filtration, 10% of water was added and the solution cooled. Crystals were obtained which melted at 153–156° and were identical to the 3,3'-dicyclohexene-2 diethylstilbestrol obtained by rearrangement of the ether. Yield 0.15 g.

Analysis calculated for $C_{30}H_{36}O_2$: C, 84.1; H, 8.41. Found: C, 83.25; H, 8.56.

*Preparation of the dicyclohexene-2 ether of hexestrol.*—Ten and eight-tenths grams of hexestrol were reacted in the same manner as described in method II for the preparation of the dicyclohexene-2 ether of diethylstilbestrol. The product obtained after treatment with alkali was crystallized twice from 95% ethanol. M. P. 123–124°. Yield: 5.86 g. (34.1%).

Analysis calculated for $C_{30}H_{38}O_2$: C, 83.75; H, 8.84. Found: C, 83.57; H, 8.68.

*Preparation of 3,3'-dicyclohexene-2 hexestrol.*—This compound was prepared in the manner described for 3,3'-dicyclohexene-2 diethylstilbestrol. One and a half grams of the dicyclohexene-2 ether of hexestrol yielded 0.58 g. of rearranged product. M. P. 160–171°.

Analysis calculated for $C_{30}H_{38}O_2$: C, 83.75; H, 8.84. Found: C, 83.4; H, 9.06.

*Preparation of 3,3'-dicyclohexene-2 hexestrol dibenzoate.*—This compound was prepared in the manner described for 3,3'-dicyclohexene-2 diethylstilbestrol dibenzoate. One gram of the di-cyclohexene-2 ether of hexestrol when reacted with 2 g. of benzoic anhydride in diethylaniline and crystallized from a carbontetrachloride methanol mixture yielded 0.98 g. of a product melting at 198–201°. Repeated analysis showed the probable existence of one mole of methanol of crystallization.

Analysis calculated for $C_{44}H_{46}O_4 \cdot CH_3OH$: C, 80.6; H, 7.47. Found: C, 80.64; H, 7.06.

When a larger quantity of the dicyclohexene-2 ether of hexestrol was reacted in the described manner, a small amount of ether insoluble material was obtained. Crystallization from a carbontetrachloride-methanol mixture yielded a compound which gave the same analytical values as the major product. M. P. 211–215°.

Analysis calculated for $C_{44}H_{46}O_4 \cdot CH_3OH$: C, 80.6; H, 7.47. Found: C, 80.66; H, 7.05.

*Preparation of 3,3'-dicyclohexene-2 hexestrol dipropionate.*—Twenty-seven hundredths of a gram of 3,3'-dicyclohexene-2 hexestrol was refluxed with 10 ml. of propionic anhydride for 2½ hours. The product obtained after hydrolysis of the mixture with water was crystallized twice from 95% ethanol. Yield 0.15 g. M. P. 133.5–135°.

Analysis calculated for $C_{36}H_{46}O_4$: C, 79.7; H, 8.48. Found: C, 79.5; H, 8.46.

*Preparation of the dicyclohexene-2 ether of dienestrol.*—10.64 g. of dienestrol were reacted in the same manner as described in method II for the preparation of the dicyclohexene-2 ether of diethylstilbestrol. The product was twice crystallized from acetone. Yield 5.32 g. M. P. 155–155.5°.

Analysis calculated: C, 84.60; H, 7.98. Found: C, 84.36; H, 7.98.

*Preparation of 3,3'-dicyclohexene-2-dienestrol dibenzoate.*—This compound was prepared in the same manner described for 3,3'-dicyclohexene-2 diethylstilbestrol dibenzoate. 1 g. of dicyclohexene-2 ether of dienestrol yielded 0.73 g. of the benzoate. Softening 154° and melting to turbid liquid.

Calculated for $C_{44}H_{42}O_4 \cdot CH_3OH$: C, 81.08; H, 6.9. Found: C, 81.11; H, 6.57.

While in the foregoing description, we have set forth specific steps in detail for the purpose of illustrating specific embodiments of the invention, it will be understood that such details in procedure may be varied widely by those skilled in the art without departing from the spirit of our invention.

We claim:

1. In a process for preparing 3,3'-cyclohexene derivatives of an estrogen selected from the group consisting of hexestrol, diethylstilbestrol, and dienestrol, the step of heating to a reaction temperature the cyclohexene-2 ether of the estrogen in an N-disubstituted aniline.

2. In a process for preparing 3,3'-cyclohexene derivatives of an estrogen selected from the group consisting of hexestrol, diethylstilbestrol, and dienestrol, the step of heating to a reaction temperature the cyclohexene-2 ether of the estrogen in an N-disubstituted aniline and in an atmosphere of nitrogen.

3. In a process for preparing 3,3'-cyclohexene derivatives of an estrogen selected from the group consisting of hexestrol, diethylstilbestrol, and dienestrol, the steps of heating to a reaction temperature the cyclohexene-2 ether of the estrogen in an N-disubstituted aniline, and adding an acid anhydride to the reaction mixture.

4. In a process for preparing 3,3'-cyclohexene derivatives of an estrogen selected from the group consisting of hexestrol, diethylstilbestrol, and dienestrol, the steps of heating to a reaction temperature the cyclohexene-2 ether of the estrogen in an N-disubstituted aniline, and introducing benzoic anhydride in the reaction mixture.

5. As a new compound, 3,3'-cyclohexene-2-diethylstilbestrol.

6. As a new compound, 3,3'-cyclohexene-2-diethylstilbestrol ester.

7. As a new compound, 3,3'-cyclohexene-2-hexestrol.

8. As a new compound, 3,3'-cyclohexene-2-hexestrol ester.

9. As a new compound, 3,3'-cyclohexene-2-dienestrol.

10. 3,3' cyclohexene-2-substituted estrogen selected from the group consisting of diethylstilbestrol, hexestrol and dienestrol and their esters.

EMIL KAISER.
ALFORD L. ANDERSEN, Jr.
JERRY J. SVARZ.

REFERENCES CITED

The following references are of record in the file of this patent:

UNITED STATES PATENTS

| Number | Name | Date |
| --- | --- | --- |
| 2,211,467 | Kimball et al. | Aug. 13, 1940 |
| 2,319,197 | Bachman et al. | May 18, 1943 |
| 2,346,049 | Rohrman | Apr. 4, 1944 |
| 2,400,033 | Tallman et al. | May 7, 1946 |
| 2,402,054 | Kharasch | June 11, 1946 |
| 2,410,463 | Schwarzkopf | Nov. 5, 1946 |
| 2,411,586 | Morris | Nov. 26, 1946 |

OTHER REFERENCES

Adams et al.: Organic Reactions, vol. II, pub. by Wiley, N. Y. (1944), pages 1 to 6 and 23 to 26.

Cornforth et al.: Chem. Abs., vol. 33, 148-9 (1939).